United States Patent [19]
Isobe

[11] 4,336,991
[45] Jun. 29, 1982

[54] EXPOSURE MODE CHANGEOVER DEVICE FOR INTERCHANGEABLE LENS MOUNTING

[75] Inventor: Takashi Isobe, Tokyo, Japan

[73] Assignee: Canon Kabushiki Kaisha, Tokyo, Japan

[21] Appl. No.: 109,419

[22] Filed: Jan. 3, 1980

[30] Foreign Application Priority Data

Jan. 19, 1979 [JP] Japan .............................. 54-5808[U]

[51] Int. Cl.³ ............................................ G03B 17/14
[52] U.S. Cl. ..................................... 354/286; 350/257
[58] Field of Search .................. 354/271, 286; 350/257

[56] References Cited

U.S. PATENT DOCUMENTS

| 3,758,198 | 9/1973 | Kanie et al. | 354/286 |
| 3,762,295 | 10/1973 | Kitai | 354/286 |
| 3,782,261 | 1/1974 | Araki | 354/286 |
| 3,864,707 | 2/1975 | Shirasaki | 354/271 |
| 3,906,534 | 9/1975 | Shirasaki | 354/286 |
| 3,968,504 | 7/1976 | Komine | 354/286 |
| 4,003,068 | 1/1977 | Hashimoto et al. | 354/286 |
| 4,017,878 | 4/1977 | Hagiwara | 350/257 |
| 4,247,190 | 1/1981 | Hashimoto et al. | 354/286 |

FOREIGN PATENT DOCUMENTS

| 2529715 | 1/1976 | Fed. Rep. of Germany | 354/286 |
| 52-42116 | 4/1977 | Japan | 354/286 |

*Primary Examiner*—Russell E. Adams
*Attorney, Agent, or Firm*—Toren, McGeady & Stanger

[57] ABSTRACT

An interchangeable lens assembly having an adapter member which is maintained rotatively fixed relative to a camera during mounting of the lens assembly, and a lens barrel subassembly rotatable relative to the adapter member and the camera to effect mounting operation, includes a signal transmitting member cooperative with a control member in the camera body for transmission of exposure control signals. A signal member for exposure mode selection is arranged in the lens assembly to project outwardly beyond the surface of the adapter member facing toward the camera and to be retracted therefrom, depending upon whether manual or automatic exposure modes are selected, and when the diaphragm setting ring is rotated to select either one of the modes, information representative of the so-selected mode is transmitted into the camera body.

7 Claims, 15 Drawing Figures

EXPOSURE MODE CHANGEOVER DEVICE FOR INTERCHANGEABLE LENS MOUNTING

BACKGROUND OF THE INVENTION

1. Field of the Invention

This invention relates to mechanical mountings for interchangeable lenses, and more particularly to a changeover device for effecting operation in the manual exposure mode and the automatic exposure mode.

2. Description of the Prior Art

It is known to provide a lens barrel having a construction wherein when the lens is attached to and tightened in the camera, the signal member in the lens mounting is maintained in non-rotative relation relative to the control member in the camera body, and wherein a manual-and-automatic exposure mode changeover device is used as disclosed in U.S. Pat. No. 3,864,707 of Shirasaki.

The coupling mechanism of the Shirasaki patent is constructed in the form of a tightening ring constrained at the rear end portion of the lens barrel and axially movably fitted thereon, while the tightening effect is produced by the bayonet member provided in the tightening ring. The interchangeable lens assembly with such coupling device is, however, difficult to handle during attachment to and detachment from the camera body.

A new type of mechanical mounting has been proposed which is improved over the Shirasaki patent with respect to the manageability of the coupling device and which retains the feature that the signal member in the lens assembly is maintained responsive to the camera mechanism in a predetermined position so that the signal communication can be accurately established. This mechanical mounting comprises an adapter member restrained from rotation in a predetermined position relative to the camera body during mounting, and lens barrel means including a main support tube rotatable relative to the adapter member and a bayonet carrying member. In the disassembled condition, before the lens assembly is attached to the camera body, the adapter member and lens barrel means are maintained in predetermined relationship to each other, and the signal member for transmission of exposure information is also maintained in predetermined constant position along with the adapter member. When the lens assembly is attached to the camera body, the operator may grasp any part of the lens barrel means, such as the focusing ring, or the diaphragm presetting ring fitted on the main support tube, and by turning the lens barrel means about the optical axis, coupling between the bayonet member of the lens assembly and the bayonet member of the camera body may be effected.

The structure of the mechanical mounting for the lens employing this new coupling mechanism is complicated, and it is particularly difficult to incorporate an exposure mode changeover device for transmitting a selected one of the signals representative of the manual exposure mode and the automatic exposure mode in the mechanical mounting of this construction wherein the adapter member carrying the signal member is fixed relative to the camera body while the lens barrel means is rotated during mounting.

The arrangement of a changeover pin for transmission of the selected signal in a predetermined position of the camera through the adapter member involves particular difficulty with regard to accurately controlling the relative spatial relationship between the individual members since the diaphragm setting ring is caused to rotate when the lens is attached.

SUMMARY OF THE INVENTION

An object of the present invention is to combine the advantages of this new lens mounting arrangement which provides an improvement over the conventional interchangeable lens mounting with an exposure mode changeover device that retains the advantage of enabling accurate transmission of an exposure control signal between the lens assembly and the camera body.

Another object of the present invention is to utilize a clutch mechanism in performing engagement and disengagement of the diaphragm setting ring with the exposure signal member in the new mechanical mounting and to provide an exposure mode changeover device capable of controlling the projecting and retracting operation of the changeover pin by the use of the clutch mechanism.

Briefly, the present invention may be described as an interchangeable lens assembly for a camera which includes means for enabling the lens assembly to be operated in a manual exposure mode and an automatic exposure mode in response to cooperating exposure means in the camera. The lens assembly of the invention comprises lens barrel means having operative components of the lens assembly mounted therewith, said operative components including diaphragm means for determining an exposure aperture. Coupling means are provided on the lens barrel means to be rotated in fixed engagement therewith bringing the coupling means into releasable engagement with complementary coupling means on the camera for mounting the lens assembly in operative position on the camera. The lens assembly includes adapter means mounted on the lens barrel means in rotative relationship relative thereto, said adapter means including retainer means adapted to cooperate with complementary retainer means on the camera for holding the adapter means rotatively fixed relative to the camera, and means for maintaining the lens barrel means in rotatively fixed engagement with the adapter means when the lens barrel means and the adapter means are in a predetermined rotative position relative to each other and for releasing said fixed engagement when the interchangeable lens assembly is brought into mounting engagement with the camera. Furthermore, the invention provides control means on the interchangeable lens assembly including means adapted to be brought into cooperative relationship with the camera for enabling the lens assembly to be set to a manual exposure mode and to an automatic exposure mode, said control means including means for transmitting to the camera an indication of the set mode of the lens assembly. The transmission means comprise pin means adapted to be moved between a first and a second position indicative respectively of the automatic and manual exposure mode settings of the lens assembly. The control means further include a diaphragm setting ring and a clutch ring operatively associated with the diaphragm setting ring. When the diaphragm setting ring is set to the automatic exposure mode prior to the lens assembly being mounted on the camera, first cam means on the diaphragm setting means actuate the pin means into the position indicating the automatic exposure mode setting. During the time that the lens assembly is attached to the camera, when the diaphragm setting ring is moved to the automatic setting, second clutch means on the clutch ring will operate to move the pin means into the position indicating the automatic exposure mode setting of the diaphragm setting ring.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

FIGS. 8 to 11 are similar views showing another embodiment of a changeover device having a control pin 32 arranged to be actuated only when the interchangeable lens is attached to the camera body.

DESCRIPTION OF THE PREFERRED EMBODIMENTS

The present invention will be described with reference to an embodiment thereof comprising a changeover device for switching between the automatic and manual exposure mode in an interchangeable lens assembly of the type having an adapter member arranged to be held stationary relative to the camera body when the assembly is mounted on the camera with a lens barrel structure which is rotated during mounting. The lens barrel structure includes a bayonet member, a diaphragm setting ring, a signal member for transmission of diaphragm value information between a diaphragm unit in the lens assembly and an exposure control mechanism in the camera body. The diaphragm setting ring and a drive member for controlling the movement of the diaphragm unit are maintained in a constant position relative to the adapter member and are brought into operative connection with respective control members in the camera body as the lens assembly is mounted on the camera.

Referring first to FIGS. 1a to 4, an example of an interchangeable lens assembly to which this changeover device is applied will be described. The changeover device will also be described with reference to FIGS. 5 and 6. Also, an example of a modification of the changeover device according to the invention will be described with reference to the drawings beginning with FIG. 8.

Figure 2A:
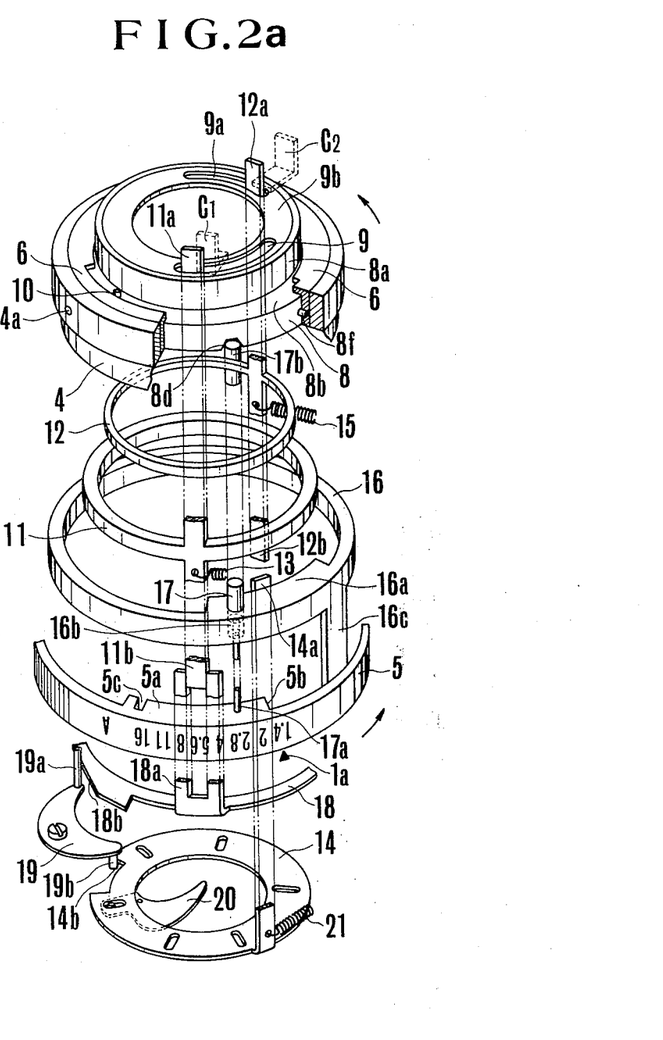
FIGS. 2a and 3a are exploded perspective views of the main parts of the mechanism within the lens barrel means for the interchangeable lens assembly to which the changeover device of the invention is applied with FIG. 2a showing a position before the lens is attached to the camera body, and with FIG. 3a showing a position after the lens is attached to the camera body.
Figure 2B:
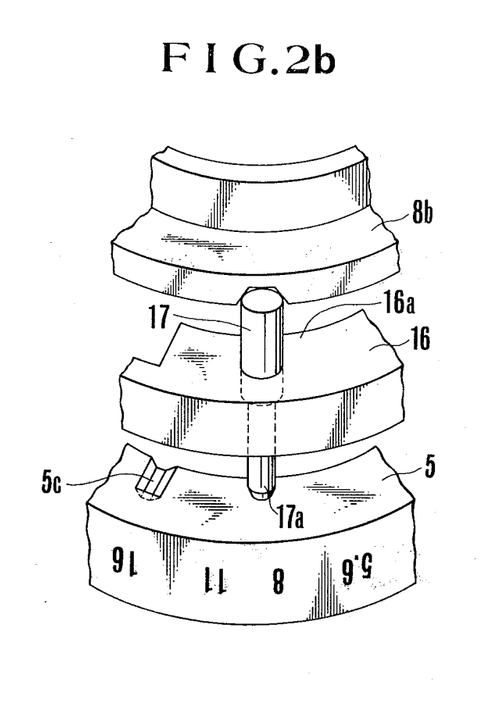
FIGS. 2b and 3b are fragmentary perspective views showing the connecting and disconnection positions of an adapter member 8, clutch ring 16 and diaphragm setting ring 5 with respective conditions of a clutch pin 17 relative to a groove 5c provided in the diaphragm setting ring.

In the drawings, a main support tube 1 is formed with an annular configuration and with a threaded portion for distance adjustment in the front internal surface thereof. An index 1a is provided for registry with a diaphragm scale on a diaphragm setting ring to be described hereinafter. A distance adjusting or focusing ring 2 is formed unitarily with an intermediate helicoid ring 2' engaging with the threaded portion of the main support tube 1. A lens cell member 3 for holding at least a portion of a lens optical system L engages with the internal helicoid of the intermediate helicoid ring 2'. A bayonet mount carrying ring 4 is fixed unitarily with the rear end portion of the main support tube 1, and an index 4a representing an attachment reference position is provided on the external periphery of the carrying ring 4. A diaphragm setting ring 5 is rotatably fitted in a recess formed in a portion of the main support tube 1 and ring 4. The diaphragm setting ring 5 is provided with a scale for manual setting of diaphragm values and with an index mark A for setting the diaphragm mechanism for automatic adjustment of the diaphragm aperture. A bayonet member 6 fixed to the rear end portion of the bayonet mount carrier ring 4 by screws or other suitable fasteners functions to effect mounting engagement with a complementary bayonet ring on the camera housing when the lens is mounted on the camera body. It is noted that the bayonet member is provided either with slits (not shown) formed in portions thereof, or with resilient members (not shown), to impart a spring force between the bayonet coupling 6 and the bayonet in the camera body. An adapter member 8 is rotatably fitted in a recess defined by the main support tube 1 at the rear end surface thereof and in a stepped portion 6a formed in the inner surface of the bayonet mount ring 6. The adapter member 8 has its rear end portion formed in a tubular shape and a standard fit diameter portion 8a for coupling with the bayonet member in the camera body. A rear wall member 9 having an on-axis opening is fitted in the fit diameter portion 8a. Formed in the rear wall member 9 are arcuate slots 9a and 9b through which pass signal members 11a and 12a from the lens mounting to the camera body. A position adjusting pin 10 mounted on a mount reference surface 8b of the adapter member 8 is arranged for engagement with a recess (not shown) formed on the bayonet member in the camera body to restrain the adapter member 8 from rotation relative to the camera body during mounting of the lens assembly. A diaphragm signal member 11 has a first arm portion 11a engaging with a signal member C1 in the camera body which cooperates with an exposure control mechanism (not shown) of known construction in the camera body. The first arm portion 11a engages in a diameter portion (not shown) in the axially extended portion of the adapter member 8. The member 11 is rotatable about the optical axis, and is restrained from axial movement. The diaphragm signal member 11 has a second arm portion 11b extending in the opposite direction to the first arm portion 11a, with the second arm portion 11b being arranged to cooperate with a diaphragm presetting mechanism to be described hereinafter. The diaphragm signal member 11 is biased by a first spring 13 tensioned between the signal member 11 and a portion of the adapter member 8 to turn in a counterclockwise direction. An automatic diaphragm ring 12, for actuating a diaphragm unit by a driving force received from the camera body, is fitted in the elongated portion of the adapter member 8 to be rotatable about the optical axis and restrained from axial movement. A first arm portion 12a extending from a portion thereof to the camera body is arranged to be engageable with a drive force transmitting member C2 in the camera body, and a second arm portion 12b which extends in the opposite dirction is arranged to be engageable with an armed portion 14a of a diaphragm drive ring 14. The automatic diaphragm ring 12 is biased by a second spring 15 connected to the adapter member 8 to turn in a clockwise direction and its position is adjusted in abutment against one end of an elongated slot 9a of the rear wall member 9. As shown in FIG. 2, in a state before the lens is attached to the camera, the above described second arm 12b of the automatic diaphragm ring is maintained at a predetermined distance from the diaphragm drive ring arm 14a. During attaching operating of the lens to the camera body, the main support tube 1, the ring 4 and the bayonet mount ring 6 are rotated relative to the adapter member 8, and the diaphragm drive ring 14 is also rotated in a counterclockwise direction so that the arm 14a is brought into engagement with the arm 12b (see FIG. 3a). A clutch ring 16 is arranged between the recess (not shown) of the rear portion of the main support tube 1 and the front end surface of the bayonet carrier ring 4 to be rotatable about the optical axis and to be restrained from axial movement. The clutch ring 16 has a projected portion 16a extended in the radial direction from a portion of the ring, and this projected portion is provided with a penetration hole 16b formed in a parallel direction to the optical axis into which a clutch pin 17 is inserted. The front end 17a of the clutch pin 17 rides on an engagement portion 5a facing in an axial direction from a portion of the diaphragm setting ring 5, and the rear end 17b is arranged to be engageable with a tapered groove 8d formed on the front end surface 8c of the adapter member 8. One end surface of the projected portion 16a abuts against the armed portion 11b of the diaphragm signal member 11 which is biased to turn in the counterclockwise direction by the spring 13, and the projected portion 16 determines at its end surface the positions of the arms 11a and 11b of the diaphragm signal member when the lens is detached from the camera. A preset cam ring 18 is rotatably supported on the main support tube 1, and a fork-like arm portion 18a extending from a portion of the ring 18 in a direction to the rear portion of the lens engages with the second arm portion 11b of the diaphragm signal member. The preset cam ring 18 has a camming surface 18b against which abuts a first pin 19a of a bellcrank 19 pivotally mounted on the main support tube 1. Extending in the opposite direction to the pin 19a of the bellcrank 19 is a second pin 19b engaging with the diaphragm drive ring 14 at the engagement portion 14b. A spring member 21 tensioned between the arm portion 14a of the diaphragm drive ring and the main support tube 1 operates to urge the diaphragm drive ring 14 in a counterclockwise direction, causing diaphragm blades 20 to be urged always in a constant direction. The diaphragm preset mechanism comprising the preset cam ring 18, bellcrank 19 and the like, and the diaphragm unit comprising the diaphragm drive ring 14, diaphragm blades 20 and the like, are of construction known in the art so that further explanation is not required.

Figures 1A, 1B, 4:
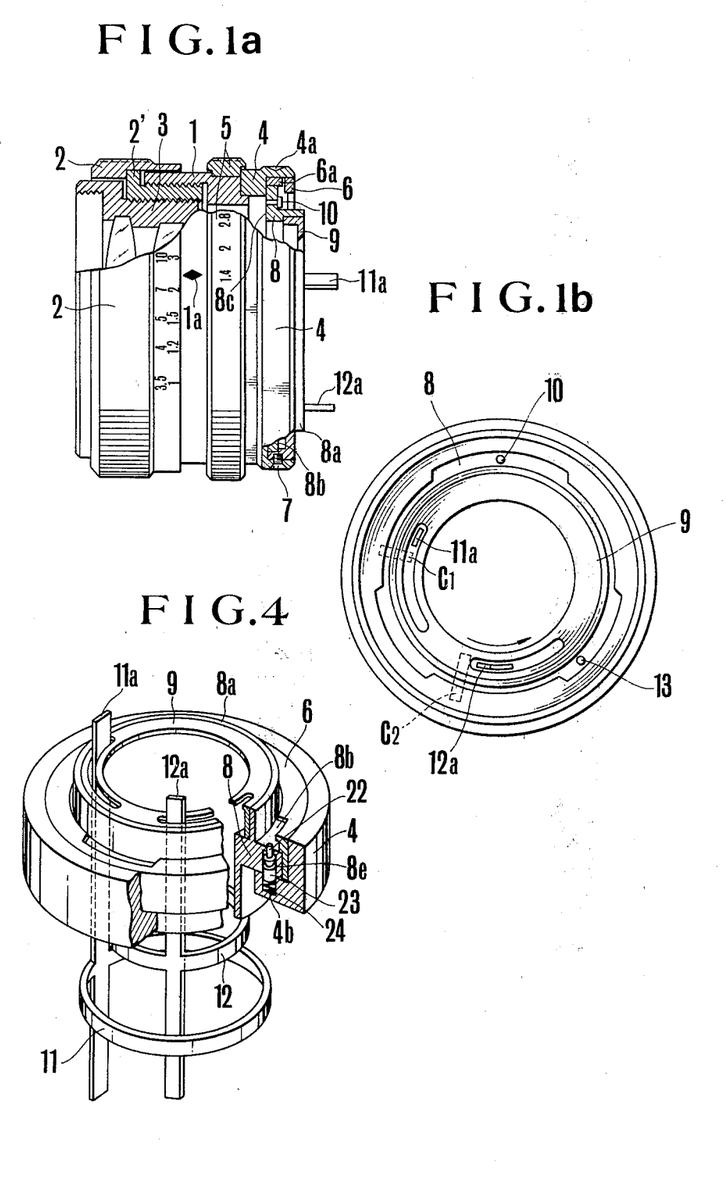
FIG. 1a is a side elevational view of an interchangeable lens mounting employing one form of a changeover device for switching between the manual exposure mode and the automatic exposure mode in accordance with the present invention with portions broken away to illustrate the internal mechanism thereof.
FIG. 1b is a plan view looking from the back showing a spatial relationship between the control member (C1, C2) in the camera body and the signal members (11a, 12a) in the lens mounting.
FIG. 4 is a partly perspective, partly sectional view showing a lock mechanism arranged between the adapter member and lens barrel means of the interchangeable lens assembly with which the invention is used.

FIG. 2a shows the lens detached from the camera body during which time the adapter member is maintained in predetermined spatial relation to the lens barrel means which may be considered as comprised of the main support tube 1, bayonet carrier ring 4, intermediate helicoid ring 2′ and distance adjusting ring 2. The mechanism whereby the adapter member 8 is held rotatively fixed relative to the lens barrel means consists of lock means comprising an actuator pin 22, a lock pin 23 and a spring 24 shown in FIG. 4 which operate to prevent relative rotation. In FIG. 4, the actuator pin 22, lock pin 23 and the spring 24 are located in a hole 4b formed in the bayonet carrier ring 4 and a through hole 8e formed in the adapter member 8 and aligned with the hole 4b and the actuator pin 22 is arranged with its heat projecting from the mount reference position surface 8b when the lens is detached from the camera.

During coupling operation of the lens assembly the diaphragm setting ring may be located to place any diaphragm value in registry with the index 1a, including any of the values 1.4 to 16 and the A mark. In order to attach the lens assembly to the camera body, the adapter member 8 is inserted with its standard fit diameter portion 8a into the space within the bayonet ring in the camera body, and the position adjusting pin 10 provided on the reference position surface 8b is engaged in a slot provided on the bayonet member (not shown) in the camera body so that the adapter member 8 is fixed in a constant position relative to the camera body. When the mount reference position surface 8b of the adapter member is pressed against the bayonet ring of the camera body, while the bayonet pawls and recesses of the bayonet member 6 on the lens side are mated with those of the bayonet ring on the camera body side, the actuator pin 22 and lock pin 23 of the lock means of FIG. 4 are pressed against the force of the spring 24 to release the adapter member 8 and the lens barrel means (1, 2, 2′, 4, 6) from locking connection with each other so that they are made relatively rotatable.

In the condition of the lens assembly prior to mounting on the camera body, as shown in FIG. 2a, the adapter member 8 and the clutch ring 16 are maintained in connection with each other by the clutch pin 17 (FIG. 2b), and the arm 12a of the automatic diaphragm ring is urged by the spring 15 to turn in the clockwise direction, abutting against one end of the elongated arcuate slot 9a of the rear wall member 9. The arm 11b of the diaphragm signal member is urged by the spring 13 to turn in the counterclockwise direction, being maintained in abutment against the left hand side surface of the engagement portion 16a of the clutch ring. Therefore, the adapter member 8 and the lens barrel means comprising the main support tube 1, bayonet carrier ring 4 and clutch ring 16 are maintained in relative spatial relationship by the relation of the clutch ring-clutch pin, and at the same time the automatic diaphragm member 12a and diaphragm signal member 11a are also retained in the predetermined positions. When the main support tube 1, bayonet carrier ring 4, bayonet member 6 and diaphragm setting ring 5 are rotated relative to the adapter member 8 and camera, the clutch ring 16 is maintained in non-rotative engagement with the adapter member 8 at the initial stage of rotation. After the diaphragm setting ring 5 is turned by a predetermined angle, the engagement surface 5b of the engagement portion thereof is brought into abutting engagement with the arm 16c of the clutch ring 16. By this engagement of the engagement surface 5b with the arm 16c, one end 17b of the clutch pin 17 which has so far connected the clutch ring 16 with the adapter member 8 is caused to slip over the tapered surface of the groove 8d of the adapter member, and the front end 17a of the clutch pin 17 drops into the engagement groove 5c whereby release of the clutch ring 16 and the adapter member 8 is effected. At the same time, a connecting operation between the diaphragm setting ring 5 and the clutch ring 16 is performed (FIG. 3b). Then, when the lens barrel means is further turned, the bayonet member of the lens and the bayonet ring of the camera operate to effect bayonet coupling. When the rotation of the lens barrel means has reached a predetermined angle, a further rotation is inhibited, and the lens assembly is mounted on the camera by the resilient action of the slit grooves or resilient members of the bayonet member. During the mounting operation of the lens barrel means, the diaphragm setting ring 5 and the clutch ring 16 are connected with each other so that the arm 11a is moved to a position depending upon the diaphragm value set in the diaphragm setting ring 5, due to the fact that the diaphragm signal member 11 is pressed by the spring 13 against the left shoulder of the engagement portion 16a of the clutch ring 16. The arm 11a moves the control member C1 of the camera and when the set value of the diaphragm is changed from F=1.4 to F=5.6, the diaphragm signal member 11 is moved to a position corresponding to the set value through the clutch ring 16, and the control member C1 is also moved by the armed portion 11a so that when the diaphragm is operated in the manually adjusting mode, the set diaphragm signal in the lens barrel means is transmitted to the camera body. On the other hand, the arm 12a of the automatic diaphragm ring 12, while being urged in a direction to one end of the arcuate slot 9a of the rear wall member 9 by the spring 15 in the clockwise direction during the time when the lens barrel is rotated during a tightening operation, is brought either into engagement, or to a slightly displaced relation with the transmission member C2 in the camera body by the position adjustment of the adapter member 8 with the camera body. The arm 14a of the diaphragm drive member 14 of the diaphragm unit supported on the main support tube 1 engages with the arm 12b of the automatic disphragm ring 12 as the lens barrel rotates.

Figure 3A:
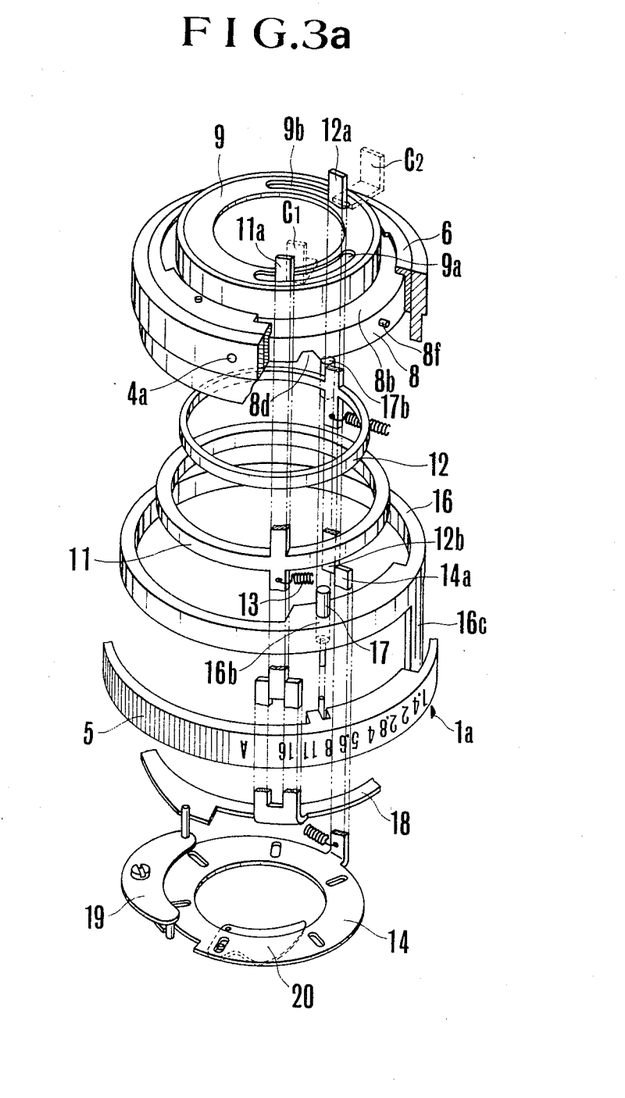
Figure 3B:
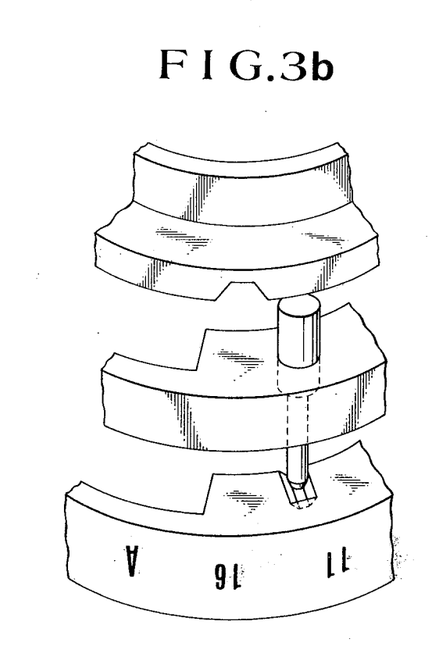

In the manner described above, the lens is mounted on the camera body, and the signal members 11a and 12a are held in engagement with the control members C1 and C2 in the camera body (see FIGS. 3a and 3b). When the diaphragm value scale of the diaphragm setting ring 5 is aligned at the automatic exposure mode mark A with the mark 1a, as the diaphragm setting ring 5 and clutch ring 16 are both rotated in the counterclockwise direction, the diaphragm signal member 11 is also caused to follow while being pulled by the spring 13. Thus, it is moved in the counterclockwise direction within the elongated slot of the rear wall member 9 to hold the control member C1 in the camera body at a predetermined position. When an exposure is to be made in this automatic exposure mode, the exposure control mechanism in the camera body determines the diaphragm value, and the control member C1 is moved from the predetermined position in correspondence with the diaphragm value, thus presetting the diaphragm by the diaphragm preset mechanism through the diaphragm signal member 11a. Then, the drive force transmitting member C2 in the camera body is actuated to move the automatic diaphragm ring arm 12a in the counter-clockwise direction, whereby the diaphragm unit is actuated at the preset diaphragm value.

The de-coupling operation of the lens assembly of FIGS. 1 to 4 from the camera body is effected with the lens barrel turned in the clockwise direction, as the adapter member 8 is maintained fixed relative to the camera, and with the diaphragm setting ring 5 and the clutch ring 16 also being turned in the clockwise direction. When the end 17b of the clutch pin comes to the position of the groove portion 8d of the adapter member, the clutch ring 16 is stopped from rotation by an inhibiting member (not shown), and in that position, the end 17b of the clutch pin 17 drops in the groove 8d, whereby the diaphragm setting ring 5 and the clutch ring 16 are released from each other, and the clutch ring 16 and the adapter member 8 are brought into engagement with each other. Then, the main support tube 1, diaphragm setting ring 5 and bayonet carrier ring 4 and further rotated in the clockwise direction through a predetermined angle at which they are stopped from further rotation by the stop member 8f. The stop member 8f is in the form of a pin mounted on the adapter member 8 and arranged upon abutment with a cutout (not shown) formed in the bayonet carrier ring 6 to regulate the angle of rotation of the main support tube 1, bayonet carrier ring 4 and bayonet member 6 relative to the adapter member 8. When the carrier ring 4 has returned to the predetermined position, the pawl portions of the bayonet member 6 in the lens mounting are disengaged from those of the bayonet member in the camera body, and thus the lens is made detachable from the camera body. When the lens is removed from the camera body, the hole 4b of the holder ring of FIG. 4 is aligned with the through hole 8e of the adapter member so that the actuator pin 22 is pushed by the spring 24. And, when the lens is removed from the camera body, the adapter member 8 and the carrier ring 4 are locked by the actuator pin 22.

The mechanism of the changeover device for the manual and automatic exposure modes will next be described by reference to FIG. 5 and those that follow. In these figures, the same reference characters as those shown in FIGS. 1 to 4 are employed to denote like parts. A T-shaped changeover pin 25 for transmitting a changeover signal representative of the manual exposure mode or the automatic exposure mode to the camera body is supported by a guide bush 26 which is held on the front end surface 8c of the adapter member 8 to be urged by a spring 27 in a forward direction of the lens assembly. A through hole 8g is formed in the mount reference surface 8b of the adapter member and one end 25c of the changeover pin 25 projects from the reference surface 8b and is arranged to cooperate with a changeover responsive member associated with the exposure control mechanism provided in the camera body. A projected portion 5d is provided in correspondence with the automatic exposure mode indicating mark A beyond the diaphragm scale on the outer periphery of the diaphragm setting ring 5. The projected portion 5d is arranged upon rotation of the diaphragm setting ring 5 to engage a portion 25a of the changeover pin 25 through a cam member 28. A projected portion 16d is arranged on the periphery of the clutch ring 16 so that when the clutch ring 16 is turned, it abuts against the lower end 25b of the changeover pin 25, whereby the changeover pin 25 is lifted upward against the force of a spring 27, causing the changeover pin 25 to project outwardly from the through hole 8g. The cam 28 is pivotally mounted at a pin 29 on the inner surface of the periphery of the carrier ring 4. The lower end portion 28a of the cam is arranged upon rotation of the diaphragm setting ring 5 to ride on a slanted surface of the projected portion 5d, whereby the cam is pivoted about the shaft 29. Further, the lower end 25a of the changeover pin 25 abuts on the upper end surface 28b of the cam 28 when the diaphragm presetting ring 5 is set in the automatic exposure mode, causing the changeover pin 25 to project outwardly from the through hole 8g.

During operation of the changeover device for the manual and automatic exposure modes with the diaphragm setting ring 5 set in the manual exposure mode (the condition of FIG. 5), both the projected portion 5d of the diaphragm setting ring 5 and the projected portion 16d of the clutch ring 16 are out of lifting contact with both lower end portions 25a and 25b of the changeover pin 25 so that the changeover pin 25 is retracted into the interior of the hole 8g by the force of the spring 27.

Figure 5:
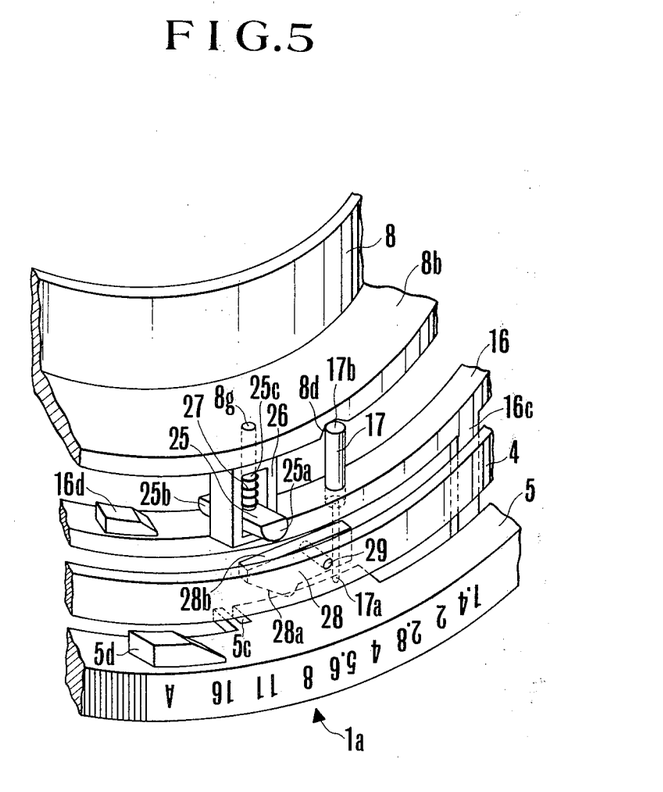
FIG. 5 is a perspective view of the main parts of a changeover device for switching between the manual exposure mode and the automatic exposure mode.
Figure 6:
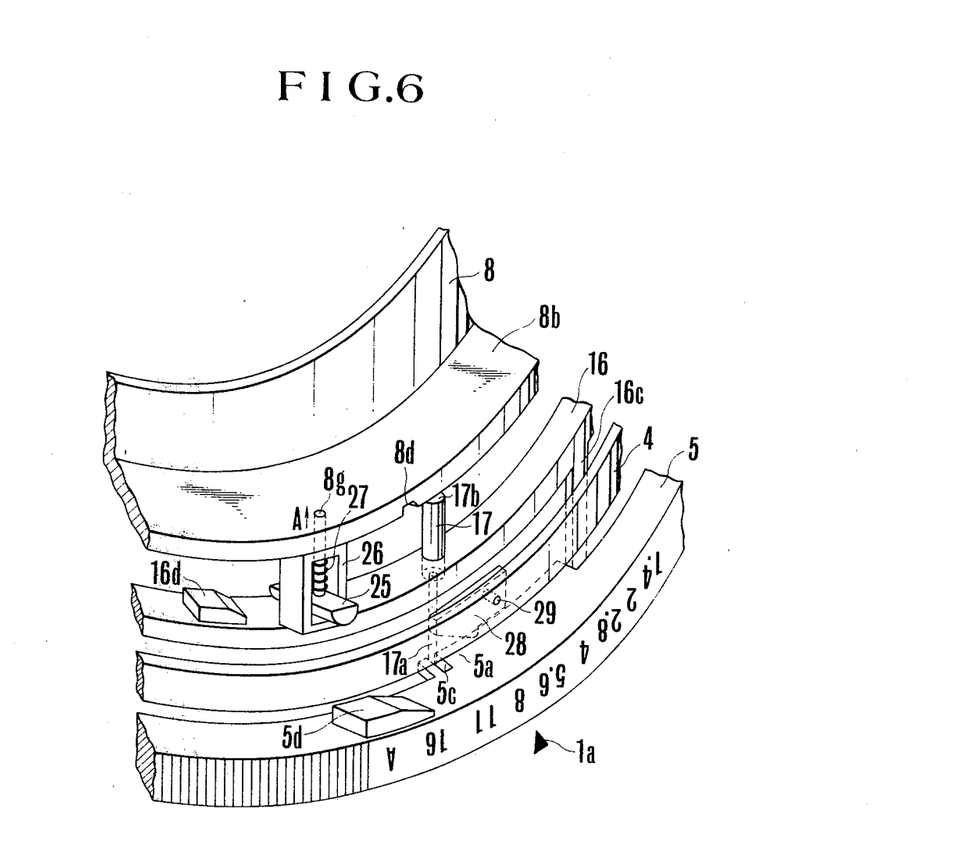
FIG. 6 is a similar view of the changeover device in an operative position occurring when the manual exposure mode is selected after the interchangeable lens assembly has been attached to the camera body.

When the lens assembly is attached to the camera body from the position of FIG. 5 where F=8.0, and as shown in FIG. 6, the clutch ring 16 and the adapter member 8 are released from connection (connecting pin 17) by the rotative operation of the lens barrel means, and the clutch ring 16 and the diaphragm setting ring 5 are connected with each other. Further rotation of the lens barrel means completes the tightening operation during which the changeover pin 25 does not abut against either of the projected portion 16d of the clutch ring or the projected portion 5d of the diaphragm setting ring. The pin 25 will not project outwardly from the through hole 8g thereby permitting the exposure control mechanism (not shown) in the camera body to operate in the manual exposure mode without causing the changeover to the automatic exposure mode.

The manual-and-automatic exposure mode changeover device according to the present invention operates with great advantage when applied to a lens barrel of the type in which when the lens assembly is attached to the camera body, the adapter member is maintained non-rotative by the distance adjusting means (distance adjusting pin 10) and in which there is provided means (clutch ring 16, the projected portion 16a of the clutch ring, spring 13 and the like) for returning the signal member (11a), which transmits an exposure control signal between the camera body and the lens assembly, to a predetermined position relative to the adapter member.

That is, the lens assembly according to the present invention facilitates the coupling operation, since the adapter member 8 is mounted without rotation relative to the camera body, and the signal transmitting member 11a is brought into operative connection with the control member C1 in the camera body by the clutch ring 16, projected portion 16a and spring member 13 at the time of attachment, and is taken slightly out of contact therewith at the time of detachment.

In order to set the automatic exposure mode in the diaphragm setting ring 5, the mark A is registered with the index 1a, and then the lens assembly is attached to the camera body, whereby the signal member 25c is projected in response to the release operation of the release means (pin 17, groove 8d, 5d) of the adapter member 8 and clutch ring 16.

In the case where the diaphragm setting ring 5 is set in the automatic exposure mode by reference to FIGS. 7(a) and 7(b), when the lens assembly is set to the automatic exposure mode before the attachment to the camera body, as shown in FIG. 7(a), the registration of the mark A on the diaphragm setting ring with the index 1a on the main support tube causes the cam 28 to ride at its lower end surface 28a on the slant surface of the projected portion 5d provided on the diaphragm setting ring at the peripheral surface thereof as the diaphragm setting ring 5 is rotated. This causes the upper end surface 28b of the cam 28 and the lower end 25a of the changeover pin 25 to be lifted upward against the force of the spring 27, while the front end 25c of the changeover pin 25 is projected outwardly from the through hole 8g. When the interchangeable lens in this state is attached to the camera, the position adjusting pin 10 is inserted into the hole of the mount portion of the camera body so that the adapter member 8 is held stationary. Then, a tightening operation by rotation of the lens barrel means is performed by grasping the lens barrel means, the connection pin 17 connecting the adapter member 8 and the clutch ring 16 is taken out of engagement in the groove 8d of the adapter member 8, and as it moves, the cam 28 is taken out of abutting engagement with the lower end 25a of the changeover pin 25. By the tightening operation of the lens assembly, the connection pin 17 enters at its lower end 17a into the groove 5c of the diaphragm setting ring 5, whereby the clutch ring 16 and the diaphragm setting ring 5 are connected to each other. By the rotation of the carrier ring 4 and the diaphragm setting ring 5, the clutch ring 16 which rotates with rotation of the diaphragm setting ring is rotated, causing the projected portion 16d to move beneath the lower end 25b of the changeover pin, and therefore causing the changeover pin 25 to project outwardly from the mount reference position surface 8b of the adapter member.

By this projection of the changeover pin 25, the exposure control device (not shown) in the camera body is switched to the automatic exposure mode so that on the basis of the exposure information computed by the exposure control device, the signal member C1 is moved in accordance with the signal corresponding to the exposure information when the camera is released. The movement of the signal member C1 is followed by the signal member 11a in the interchangeable lens assembly. Then, the cam ring 18 is rotated depending upon the amount of rotation of the signal member 11a, and the diaphragm is preset to this value.

After that, when the camera is released, motion of the control member C2 is transmitted through the automatic diaphragm ring 12, 12a to the diaphragm drive ring 14 and bellcrank 19 and therefrom to the diaphragm blades 20, whereby the size of diaphragm aperture is controlled in accordance with the preset diaphragm value. In case the diaphragm setting ring is set in the manual exposure mode, as shown in FIG. 5, the changeover pin 25 is held in the retracted position by the spring member.

In this embodiment, with the lens assembly set in the automatic exposure mode before attachment to the camera body, as the changeover pin 25 is projected outwardly from the hole 8g of the adapter member 8, it is possible to prevent erroneous attachment to a camera having no automatic exposure control mechanism. That is, a camera which lacks the automatic exposure control mechanism is not provided with a hole for insertion of the changeover pin 25 formed in the mount surface of the camera housing, so that the mount surface of the lens assembly and the mount surface of the camera body do not coincide with each other. Therefore, the incompatibility between the lens assembly and the camera body can be readily recognized.

It is noted that in this embodiment the changeover pin 25 operates in a different manner when the lens assembly is set in the automatic exposure mode before attachment to the camera body than when the projecting operation of the signal member (changeover pin 25) is performed after the attachment to the camera body. That is, in the former case, the changeover pin 25 is projected by the first control means comprising the diaphragm setting ring 5, projected portion 5d and the cam 28. In the latter case, it is projected by the second control means comprising the clutch ring 16, and projected portion 16d.

By properly varying the lengths of the projected portions 5d and 16d, the length of that portion of the changeover pin 25 which is projected outwardly of the mount reference surface of the adapter member is varied depending upon which of the first and second control means acts thereon, so that before the attachment to the camera body, it is made slightly smaller to prevent damage of the pin 25 due to the force of a foreign object or to shock at the time of attachment, and so that after attachment of the lens assembly, the changeover pin 25 is fully projected to cooperate with the exposure control mechanism in the camera body.

Figure 7:
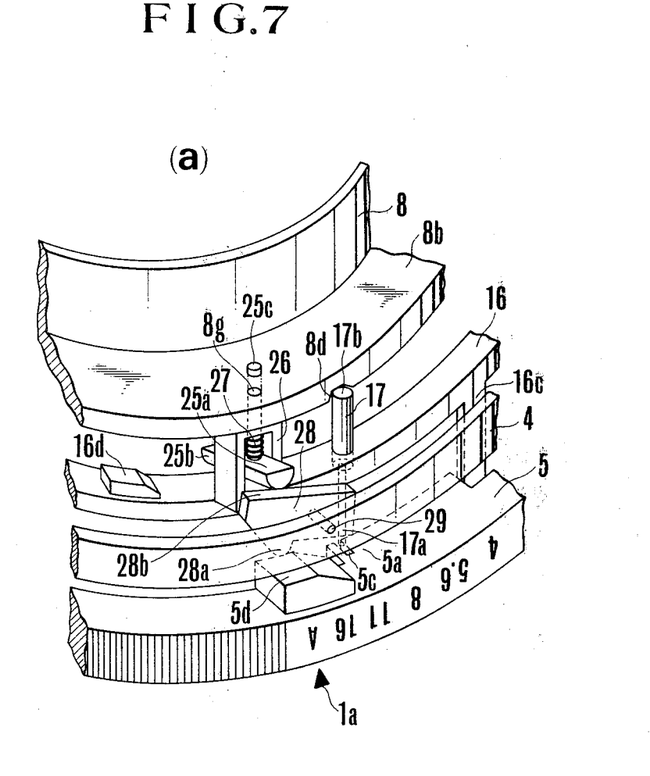
FIG. 7a is a similar view of the changeover device set in the automatic exposure mode before the lens is attached to the camera body.
FIG. 7b is a similar view of the changeover device with the interchangeable lens assembly attached to the camera body after having been set in the automatic exposure mode.
Figure 8:
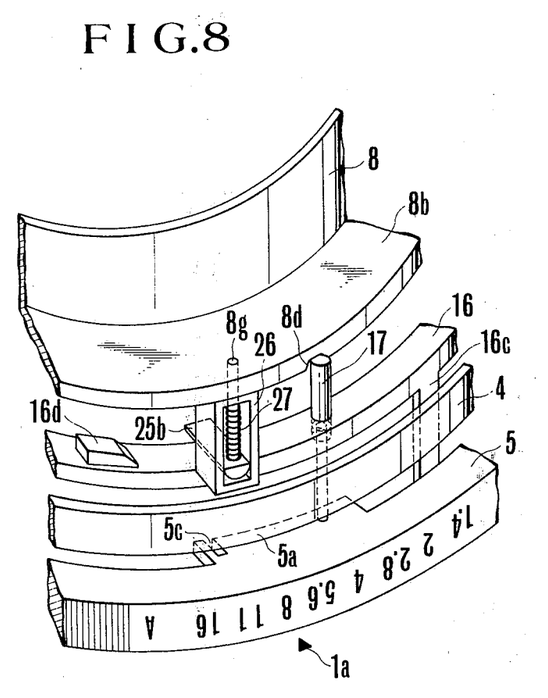
FIG. 8 shows the lens assembly set in the manual exposure mode prior to the attachment to the camera body.

In the embodiment of FIGS. 5 to 7, when the changeover device is set in the automatic exposure mode before the interchangeable lens assembly is attached to the camera body, though it is possible for the operator to recognize that setting since the changeover pin 25 is projected outwardly of the adapter member 8, there is a high possibility of exposing the changeover pin 25 to damage because it is projected before the attachment to the camera body. In order to avoid this, it is preferred to arrange the mode changeover device so that it can be actuated only when the interchangeable lens assembly is attached, as shown in FIGS. 8 to 11. That is, as shown in FIG. 8 and in the succeeding figures, the actuation is effected by the second control means in the foregoing embodiment so that the mode changeover pin 25 is actuated when the attaching operation of the interchangeable lens assembly is completed, thus preventing damage of the pin.

Figure 9:
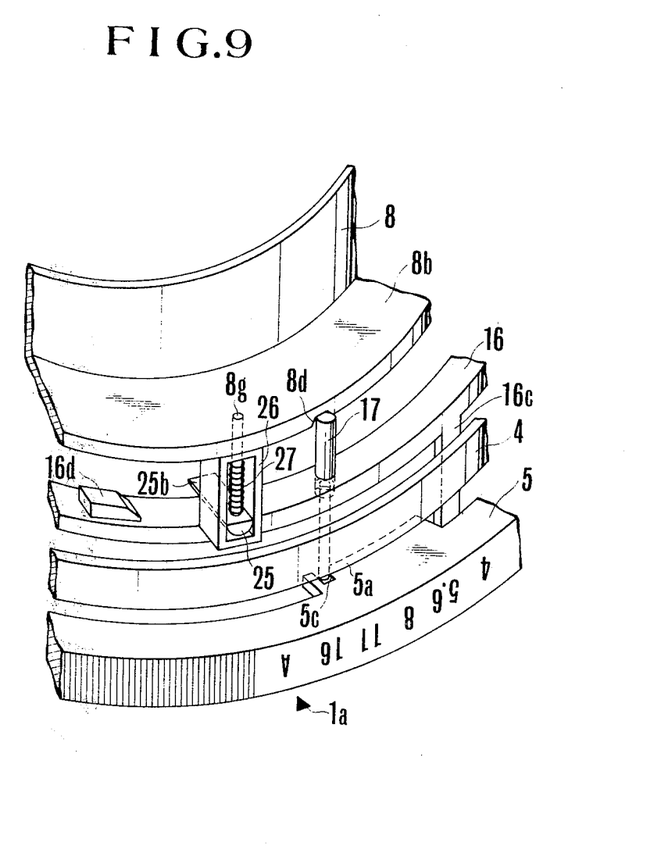
FIG. 9 shows the lens assembly set in the automatic exposure mode prior to the attachment to the camera body.
Figure 10:
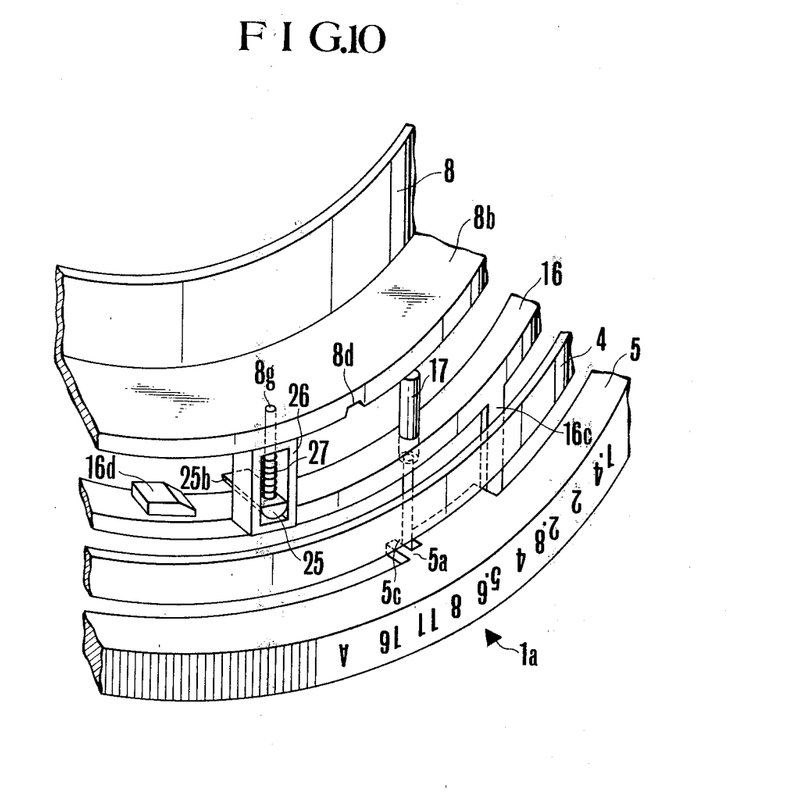
FIG. 10 shows the lens assembly attached to the camera body while being set in the position of FIG. 8.

In FIGS. 8 and 9, where the lens is detached, even when the setting to the automatic exposure mode or the manual exposure mode is effected, the changeover pin 25 is not actuated.

Figure 11:
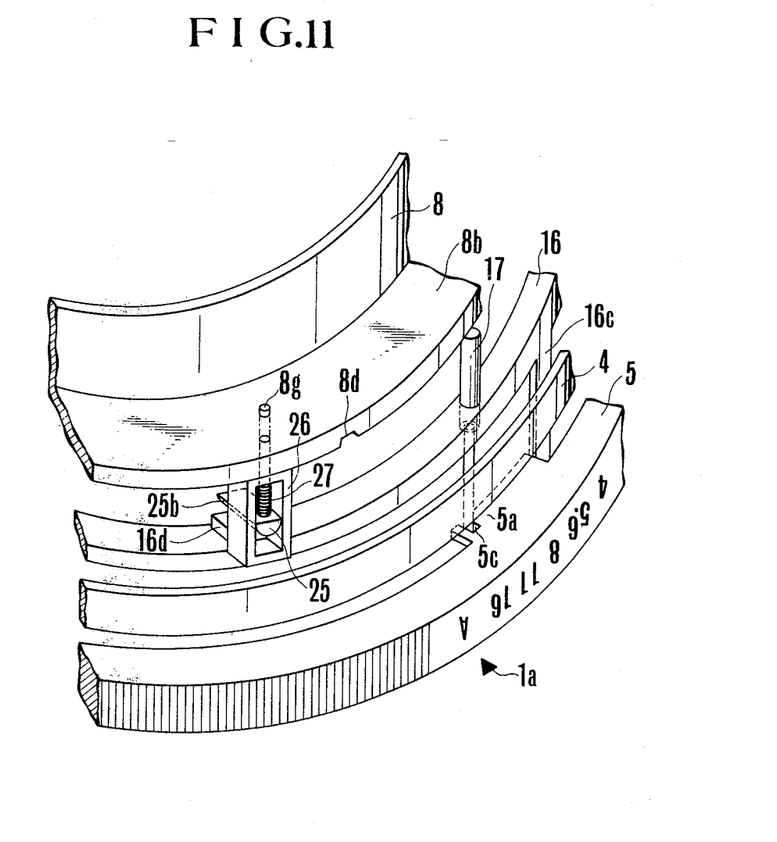
FIG. 11 shows the lens assembly attached to the camera body while being set in the automatic exposure mode.

In FIG. 9, after the automatic exposure mode is set (by placing the mark A is registry with the index 1a) when the lens is attached to the camera body, the diaphragm setting ring 5 and the clutch ring 16 are simultaneously rotated by the action of the interconnecting pin 17, and the end portion 25b of the changeover pin 25 is caused to ride on the projected portion 16d of the clutch ring 16 by the rotation of the lens barrel means, so that the pin 25 projects outwardly of the hole of the adapter member 8 (see FIG. 11). After the manual exposure mode is set as shown in FIG. 8 by placing one of the diaphragm value graduations 1.4 to 16 in registry with the index 1a, when the lens is attached to the camera body (see FIG. 10), and when the setting is changed to the automatic exposure mode by turning the diaphragm setting ring to place the mark A in registry with the index 1a, the clutch ring 16 is also rotated, causing the changeover pin 25 to ride upon the projected portion 16d of the clutch ring. Thus, the changeover pin is projected outwardly of the mount reference surface of the adapter member.

As shown above, in the embodiment of FIGS. 8 to 11, the actuation of the changeover pin 25 is effected only by the rotation of the clutch ring 16. Therefore, before the lens is attached to the camera body, the changeover pin 25 does not protrude from the lens assembly, thus preventing damage to the pin 25.

While specific embodiments of the invention have been shown and described in detail to illustrate the application of the inventive principles, it will be understood that the invention may be embodied otherwise without departing from such principles.

What is claimed is:

1. An interchangeable lens assembly capable of changing the exposure mode thereof between a first exposure mode and a second exposure mode comprising:
   (a) lens barrel means having coupling means for engagement with complementary coupling means of a camera to mount the interchangeable lens assembly on the camera;
   (b) adapter means arranged to be rotatable relative to the lens barrel means, the adapter means and the lens barrel means being arranged to maintain a predetermined spatial relationship therebetween when the interchangeable lens assembly is detached from the camera;
   (c) operation means for enabling selective changeover between the first exposure mode and the second exposure mode of the lens assembly; and
   (d) transmitting means, supported by the adapter means, for transmitting the selected exposure mode of the lens assembly to the camera on the basis of the selecting operation of the operation means.

2. An interchangeable lens assembly according to claim 1, further comprising:

means for connecting with the operation means when the lens assembly is mounted on the camera, said means actuating the transmitting means in response to the selected mode of the operation means to output the selected mode signal of the lens assembly to the camera.

3. An interchangeable lens assembly according to claim 2, further comprising:
(a) a diaphragm device;
(b) diaphragm signal transmission means operatively connected with the diaphragm device for transmitting a diaphragm signal between the lens assembly and said camera;
(c) connecting means for connecting the operation means to the diaphragm signal transmission means when the lens assembly is mounted on the camera,
said connecting means having an operation portion which actuates the transmitting means in correspondence to the selected position of the operation means.

4. An interchangeable lens assembly according to claim 3, in which the operation means has a scale representing a manual exposure mode and a scale representing an automatic exposure mode, and the operation portion of the connecting means is provided at a position corresponding to the position of the scale representing the automatic exposure mode.

5. An interchangeable lens assembly comprising:
(a) lens barrel means having coupling means for engagement with complementary coupling means of a camera to mount the interchangeable lens assembly on the camera;
(b) adapter means arranged to be rotatable relative to said lens barrel means, said adapter means and said lens barrel means being arranged to maintain a predetermined spatial relationship therebetween when said interchangeable lens assembly is detached from the camera;
(c) control means for controlling the amount of light entering said camera through said lens assembly;
(d) operation means for selectively changing over the control means to a manual exposure mode or an automatic exposure mode;
(e) exposure mode signal transmitting means supported by the adapter means and designed to be movable in a direction parallel to the optical axis; and
(f) means for actuating the exposure mode signal transmitting means by the changing over operation of the operation means, said actuating means being provided on the operation means and actuating the exposure mode signal transmitting means when the operation means reaches the position at which the operation means selects the automatic exposure mode.

6. An interchangeable lens assembly comprising:
(a) lens barrel means having coupling means for engagement with complementary coupling means of a camera to mount the interchangeable lens assembly on the camera;
(b) adapter means arranged to be rotatable relative to the lens barrel means, the adapter means and the lens barrel means being arranged to maintain a predetermined spatial relationship therebetween when the interchangeable lens assembly is detached from the camera;
(c) mode signal transmitting means supported by the adapter means;
(d) exposure signal transmitting means for transmitting an exposure signal between the lens assembly and the camera;
(e) mode changeover operation means for changing over at least first and second exposure modes;
(f) means for connecting the mode changeover means with the exposure signal transmitting means when the lens assembly is mounted on the camera, said mode signal transmitting means being controlled by operating portions on the connecting means and the mode changeover means in correspondence to the position of the mode changeover operation means.

7. An interchangeable lens assembly according to claim 1, 5 or 6 further comprising:
connecting means for connecting the operation means or the mode changeover operation means to the mode signal transmitting means,
said connecting means nullifying the connection between the operation means and the mode signal transmitting means when the operation means is selected to the first exposure mode or a manual exposure mode, and effecting the connection between the operation means and the mode signal transmitting means when the operation means is selected to the second exposure mode or an automatic exposure mode to transmit the mode signal to the camera by the mode signal transmitting means.

* * * * *